Figure 1:
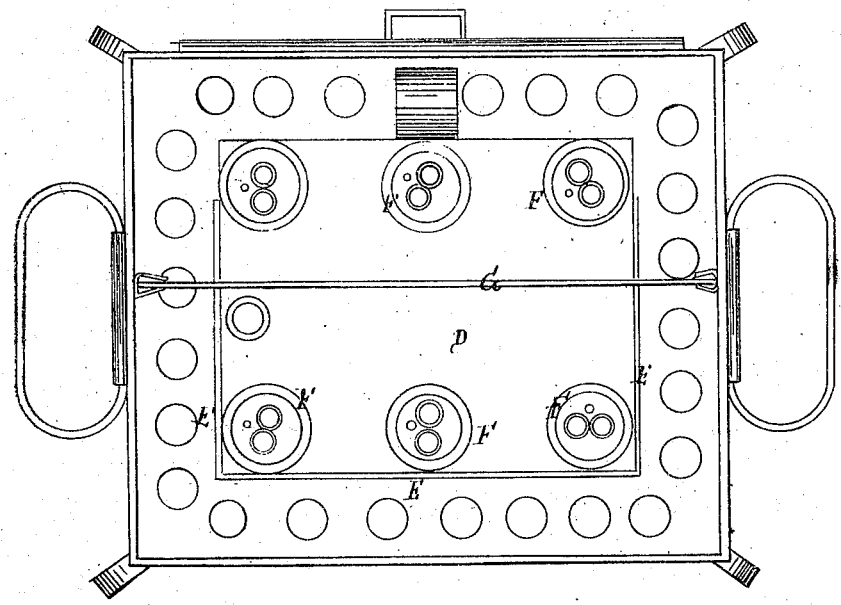
Figure 2:
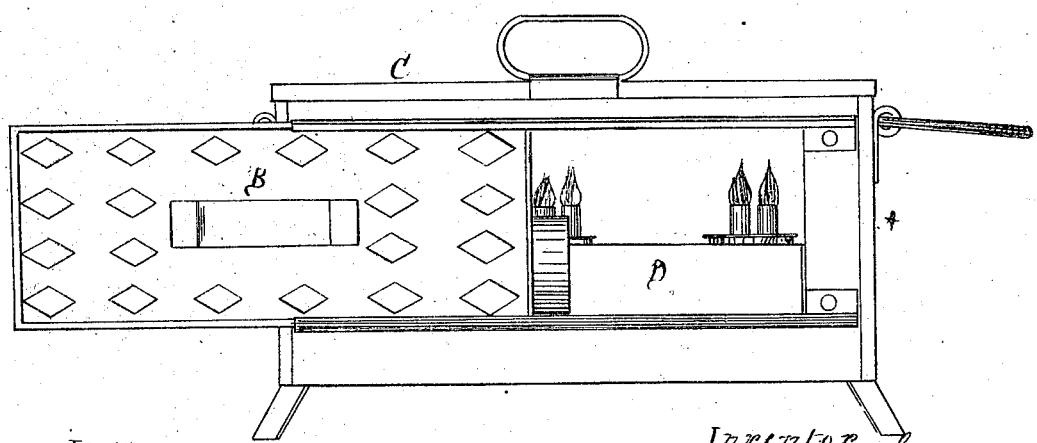

E. Small.
Sad-Iron Heater, Nurse-Lamp & Foot-Warmer.
N° 75802. Patented Mar. 24, 1868.

Witnesses
F. Lehmann
A. A. Yeatman

Inventor
Eleazer Small
Per
Alexander Yeatman
atty

United States Patent Office.

ELEAZER SMALL, OF DENNISPORT, MASSACHUSETTS.

*Letters Patent No. 75,802, dated March 24, 1868.*

SAD-IRON HEATER, NURSE-LAMP, AND FOOT-WARMER.

*The Schedule referred to in these Letters Patent and making part of the same.*

TO ALL WHOM IT MAY CONCERN:

Be it known that I, ELEAZER SMALL, of Dennisport, in the county of Barnstable, and in the State of Massachusetts, have invented certain new and useful improvements in combined "Sad-Iron Heaters, Nurse-Lamp, and Sick-Room Stove;" and do hereby declare that the following is a full, clear, and exact description thereof, reference being had to the accompanying drawings and to the letters of reference marked thereon.

In the annexed drawings, making part of this specification, A represents a square sheet-metal box, with its sides and a portion of its bottom perforated in ornamental style. B represents a sliding door, which covers a doorway in one side of the box A. D represents a lamp, which is placed upon the bottom of and within the box A, and is provided with six burners, although there may be more or less used. This lamp is confined to its place upon the bottom of the box by means of the flanges E E, which are placed upon three sides of it, there being no flange on that side of the box toward the door, so that the lamp may be drawn out for filling and trimming. G represents a partition within the box, which divides the burners, making two chambers, with burners in each. This partition is held in place by means of guides on the inside of the box, which said guides are pivoted, and are capable of being partially revolved upon their pivots, so that the partition can be set at different inclinations, or vertical, as may be desirable. C represents the top of the box, which is provided with flanges upon its sides to keep it in position when placed upon the box. This top may be drawn partially off of the box, so as to disclose one-half of the burners, when necessary. The box A is supported upon suitable legs.

When this heater is intended for heating irons, the top, C, is placed upon the box, and the irons are placed upon said top, and the lamps beneath are lighted. When required to boil milk or water, or to cook any little article, the top is partially removed, and the vessel containing the material is placed upon the box immediately over the burning lamps.

This heater may be used during the winter months as a foot-warmer.

Having thus fully described my invention, what I claim as new, and desire to secure by Letters Patent, is—

The box A, perforated as set forth, and provided with the lamp D, the movable partition G, and the sliding cover C, when the several parts are arranged and constructed as and for the purpose set forth.

In testimony that I claim the foregoing, I have hereunto set my hand, this 1st day of May, 1867.

ELEAZER SMALL.

Witnesses:
A. N. MARR,
A. A. YEATMAN.